B. WOLLNER & J. B. EISEMAN.
HAT BODY AND PROCESS OF MAKING THE SAME.
APPLICATION FILED DEC. 4, 1908.
924,408.
Patented June 8, 1909.
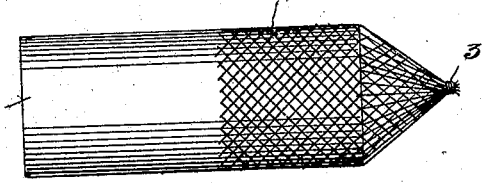
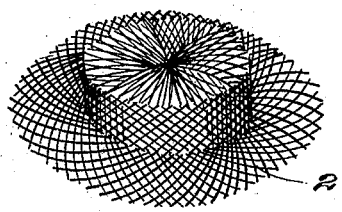
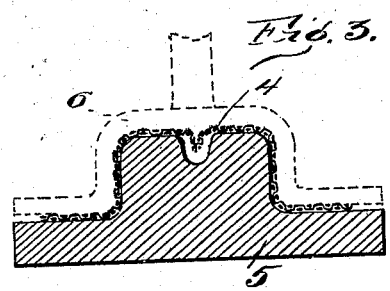
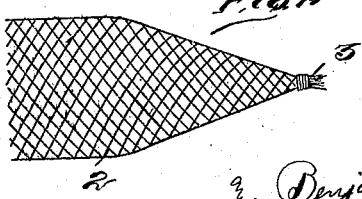
Witnesses
G. F. Tolson
O. F. Ritchin
Inventors
Benjamin Wollner
Jesse B. Eiseman
By Mason Fenwick Lawrence
their Attorneys

UNITED STATES PATENT OFFICE.

BENJAMIN WOLLNER, OF BROOKLYN, AND JESSE B. EISEMAN, OF NEW YORK, N. Y.

HAT-BODY AND PROCESS OF MAKING THE SAME.

No. 924,408.

Specification of Letters Patent.

Patented June 8, 1909.

Application filed December 4, 1908. Serial No. 466,023.

*To all whom it may concern:*

Be it known that we, BENJAMIN WOLLNER, and JESSE B. EISEMAN, citizens of the United States, and residents, respectively, of Brooklyn, in the county of Kings and State of New York, and New York city, in the county and State of New York, have invented certain new and useful Improvements in Hat-Bodies and Processes of Making the Same; and we do hereby declare the following to be a full, clear, and exact description of the invention, such as will enable others skilled in the art to which it appertains to make and use the same.

This invention relates to improvements in hats and the process of making the same, and has for an object the pressing of hat bodies from conical shapes with heated molds.

Another object in view is the forming of hat bodies by first forming the same cylindrical and then drawing the end thereof together after which the cylindrical body portion is pressed to the desired shape between heated dies.

With these and other objects in view the invention comprises certain novel constructions, combinations and arrangement of parts as will be hereinafter more fully described and claimed.

In the accompanying drawings: Figure 1 is a side elevation of a cylinder upon which has been formed a cylindrical body of material designed to be pressed into the shape of a hat. Fig. 2 is a side elevation of a conical shaped material that has been removed from the cylinder shown in Fig. 1 and the end thereof secured together. Fig. 3 is a section through a mold and hat after the same has been pressed. Fig. 4 is a perspective view of the hat immmediately after the same has been removed from the mold.

In constructing hats of various kinds, and particularly of straw or fiber sizing is usually depended upon for holding the hat in shape after once formed, and also for preventing the breaking of the fiber or straw. In case the hat should get wet or the sizing removed for any reason the hat formed in this manner would lose its shape to a large extent. In the present invention one of the objects is to form a hat without the necessity of using sizing, stiffening or the like. In forming hats according to this invention the same are preferably formed on a cylinder and consequently will be formed cylindrical. The cylindrical formed material is then removed from the cylinder and the end drawn together and tied after which the same is placed on a mold and a second mold is forced over the opposite end toward the first mentioned mold so as to hold the material between the molds and to force the same into the desired shape as outlined by the mold. The molds are heated so as to make more flexible the material of which the hat is to be formed, and also to cause the same to retain its shape after once formed.

In constructing hats according to this method the same may be made from straw, wire, silk straw, cotton, artificial silk, and other fibers or fibrous materials which are ordinarily used in the production of hat bodies. Some of the kinds that are particularly adapted for forming hats according to the present process are cotton silk, natural silk straw, including Tussah silk straw, and pyroxylin fibers, artificial horse hair or silk substitutes. The process is not applicable to the cotton or natural silk fibers unless the same have been made into straw, and on the contrary the process is only applicable to silk substitutes and pyroxylin fibers which have not been made into straw. After a cylinder of the desired length has been woven upon the form or retaining cylinder one end of the cylinder of the material is gathered together and tied. This will change the shape of the woven cylinder into approximately a conical shaped body which has the point thereof introduced into a mold or die conforming to the shape of the hat body desired to be produced. Over the cone shaped body thus introduced into the end of the die or mold, a punch or complementary mold is forced which presses the material of which the hat body is made into proper shape against the mold. The molds during the operation of pressing are heated so as to render the fiber more pliable and easily conformable to the shape of the mold.

In order that the steps of the process may be more clearly understood one form of how the same is carried out is shown in the accompanying drawings, in which 1 indicates a cylinder of any desired kind, over which a cylindrical woven body 2 is produced of fiber of any desired kind. After the cylinder 2 has been woven to the desired length the ends thereof are gathered together and tied at 3 which will produce a substantially conical shaped body as shown in Fig. 2. The point of the conical shaped body or the tied portion 3 is then introduced into a recess 4 of a heated mold 5 and then a complementary mold or punch 6 is forced over mold 5 and also the cylinder 2. This will force the cylinder 2 into the shape shown in Figs. 3 and 4. The punch 6 is heated by any desired means as well as mold 5 so as to act properly upon the material of which the hat is constructed, and for causing the same to retain its shape after its removal from the mold. In forming hat bodies of this kind the material heretofore set forth is preferably used, in order that the hats may be made without sizing and yet retain the shape given them.

What we claim is:

1. A process of forming hats, comprising the construction of a cylindrical body, the tying of one end of the same together for forming a conical shaped body, and then the pressing of the conical shaped body into the shape of a hat.

2. A process of forming hats comprising the forming of a cylindrical body, the drawing of the end thereof together for forming a substantially conical shaped body out of said cylindrical body, the placing of the end drawn together in a form, and the pressing of a second form over the conical-shaped body and the first mentioned form for shaping the conical shaped body into the form of a hat.

3. A process of forming hat bodies comprising the forming of hat bodies in conical shapes and then pressing to the desired shape in heated molds.

4. A process of making hat bodies comprising the formation of a cylindrical body of fibrous material, drawing together of the end of the cylinder and then pressing of the cylinder between heated dies until the same conforms to the shape of the dies.

5. A process of forming hat bodies comprising the provision of a cylinder of straw the drawing thereof into a substantially conical shape, and the pressing of the same into shape in a heated condition.

6. A process of forming hats, comprising the construction of a cylindrical body, the drawing of one end of the same together and then pressing of said body into the shape of a hat.

In testimony whereof we affix our signatures in presence of two witnesses.

BENJAMIN WOLLNER.
JESSE B. EISEMAN.

Witnesses:
HUGO MOCK,
HARRY C. ADAMS.